(12) United States Patent
Gomolko

(10) Patent No.: US 10,293,919 B2
(45) Date of Patent: May 21, 2019

(54) FLIGHT CONTROL DEVICE FOR AN AIRCRAFT

(71) Applicant: SAFRAN ELECTRONICS & DEFENSE, Boulogne-Billancourt (FR)

(72) Inventor: Oleg Gomolko, Boulogne-Billancourt (FR)

(73) Assignee: SAFRAN ELECTRONICS AND DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/770,174

(22) PCT Filed: Oct. 21, 2016

(86) PCT No.: PCT/EP2016/075319
§ 371 (c)(1),
(2) Date: Apr. 20, 2018

(87) PCT Pub. No.: WO2017/068102
PCT Pub. Date: Apr. 27, 2017

(65) Prior Publication Data
US 2018/0304992 A1    Oct. 25, 2018

(30) Foreign Application Priority Data
Oct. 21, 2015 (FR) ...................... 15 60037

(51) Int. Cl.
*G05G 9/047*         (2006.01)
*B64C 13/10*         (2006.01)
(Continued)

(52) U.S. Cl.
CPC .............. *B64C 13/10* (2013.01); *B64C 13/04* (2013.01); *G05G 5/03* (2013.01); *G05G 9/047* (2013.01);
(Continued)

(58) Field of Classification Search
CPC ... B64C 13/10; B64C 13/042; B64C 13/0421; B64C 13/0425; B64C 13/0427;
(Continued)

(56) References Cited

U.S. PATENT DOCUMENTS 3,409,252 A    11/1968   Miller
3,477,249 A *  11/1969   Culver ...................... F16D 3/30
                                                              464/106
(Continued)

FOREIGN PATENT DOCUMENTS

FR    3011815 A1    4/2015
WO    95/04959 A1   2/1995

OTHER PUBLICATIONS

Preliminary Research Report received for French Application No. 1560037, dated Jun. 13, 2016, 3 pages (1 page of French Translation Cover Sheet and 2 pages of original document).
International Search Report and Written Opinion received for PCT Patent Application No. PCT/EP2016/075319, dated Jan. 9, 2017, 14 pages (6 pages of English Translation and 8 pages of Original Document).
(Continued)

*Primary Examiner* — Philip J Bonzell
*Assistant Examiner* — Tye William Abell
(74) *Attorney, Agent, or Firm* — Womble Bond Dickinson (US) LLP

(57) ABSTRACT

The invention concerns a flight control device (1) for an aircraft, comprising: —a housing (2), —a handle (4) mounted rotating relative to the housing (2) about a center of rotation (O), —a first drive shaft (31), a second drive shaft (32) and a third drive shaft (33), the drive shafts (31-33) being mounted rotating relative to the housing (2) about a same axis of rotation (X), —a first connecting part (34) mounted pivoting on the first shaft (31) about a first axis of rotation ($A_1$), and on the handle (4) about a fourth axis of rotation ($B_1$), —a second connecting part (35) mounted pivoting on the second shaft (32) about a second axis of rotation ($A_2$), and on the handle (4) about a fifth axis of
(Continued)

Figure 1:
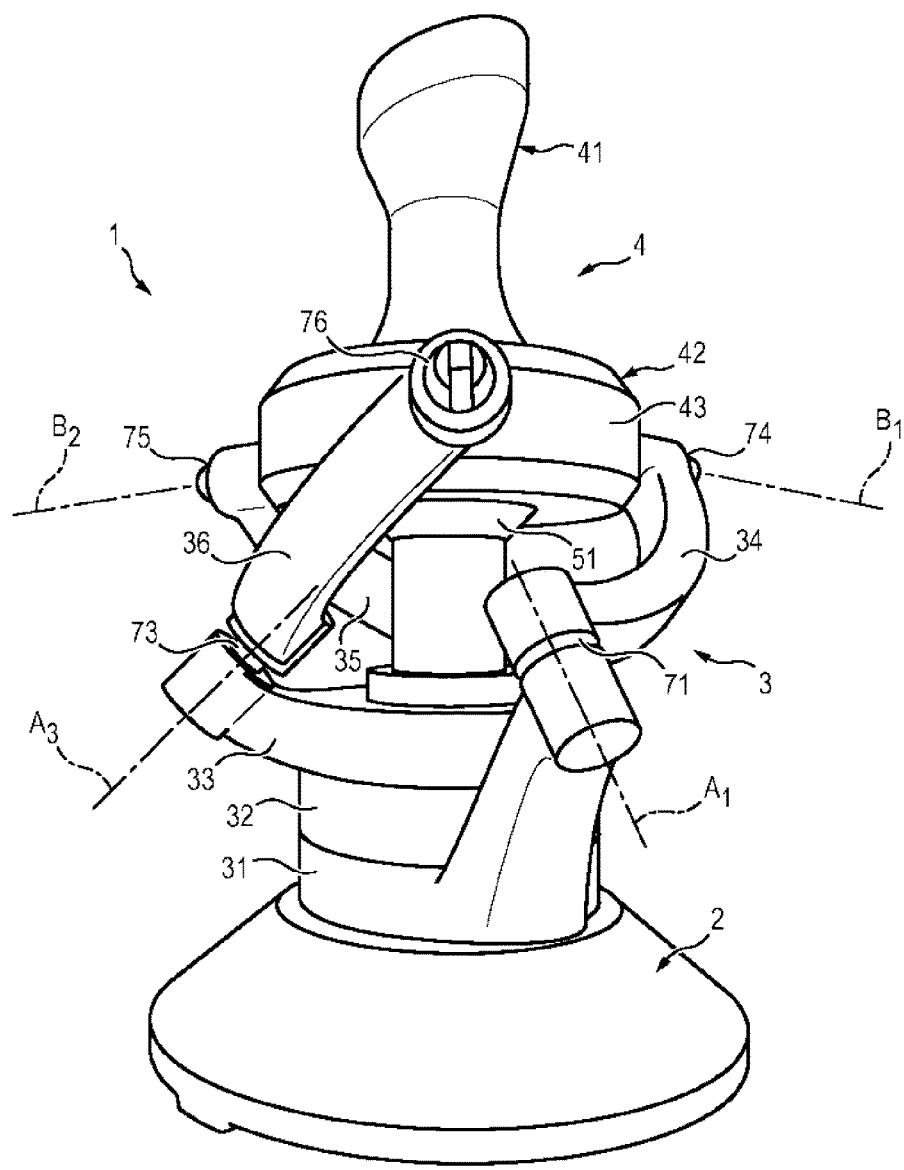

rotation ($B_2$), —a third connecting part (36) mounted pivoting on the third shaft (33) about a third axis of rotation ($A_3$), and on the handle (4) about a sixth axis of rotation ($B_3$), the first axis of rotation ($A_1$), the second axis of rotation ($A_2$) and the third axis of rotation ($A_3$) intersecting at the center of rotation (O) of the handle (4).

9 Claims, 3 Drawing Sheets

(51) Int. Cl.
  *B64C 13/04*  (2006.01)
  *G05G 5/03*  (2008.04)
(52) U.S. Cl.
  CPC ............ *G05G 2009/04703* (2013.01); *G05G 2009/04766* (2013.01)
(58) Field of Classification Search
  CPC .......... G05G 2009/04714; G05G 2009/04766; G05G 2009/04703
  See application file for complete search history.

(56) References Cited

U.S. PATENT DOCUMENTS

| | | | |
|---|---|---|---|
| 5,223,776 A * | 6/1993 | Radke | B25J 13/02 200/5 R |
| 6,418,811 B1 * | 7/2002 | Rosheim | B25J 17/0266 414/729 |
| 9,393,688 B2 * | 7/2016 | Nawrat | B25J 9/126 |
| 2009/0095108 A1 * | 4/2009 | Payandeh | B25J 13/02 74/480 R |
| 2015/0158575 A1 * | 6/2015 | Buoy | B64C 13/04 74/471 XY |
| 2016/0252926 A1 * | 9/2016 | Gomolko | G05G 5/03 244/234 |

OTHER PUBLICATIONS

International Preliminary Report on Patentability received for PCT Patent Application No. PCT/EP2016/075319, dated May 3, 2018, 12 pages (6 pages of English Translation and 6 pages of Original Document).

* cited by examiner

FLIGHT CONTROL DEVICE FOR AN AIRCRAFT

FIELD OF THE INVENTION

The invention relates to a flight control device for an aircraft.

PRIOR ART

In aircraft, the flight control devices allow the pilot to control the orientation of the flight control surfaces of the wing.

Aircraft are traditionally equipped with control sticks allowing the pilot to operate the ailerons and the elevator so as to control the attitude of the aircraft on the pitch and roll axes. The control stick is positioned between the legs of the pilot, who uses the strength of his arms to activate the stick.

In certain airplanes equipped with electrical flight controls, the control stick has been replaced by a flight control device called "ministick" (or "side stick unit"). More compact than a conventional control stick, the ministick is generally integrated into the lateral portions of the cockpit and comprises a handle which the pilot activates by moving only his fist. The installation of ministicks has allowed the space between the pilot and the instrument panel to be freed in order to install other equipment there.

Known from document FR 3 011 815 is a flight control device for an aircraft comprising a lever and a frame. The lever is connected to the frame through a mechanical linking assembly allowing rotation of the lever with respect to the frame around two perpendicular rotation axes X and Y. The rotation of the lever with respect to the frame allows the orientation of the control surfaces to control roll and pitch movements of the aircraft. The mechanical linking assembly also connects the lever to actuators to simulate force feedback during rotation of the lever.

In one embodiment proposed in this document, the actuators are coaxial.

This allows the actuators to be disposed below the frame of the control device, thus integrating the device more easily in the environment of the flight deck (for example in a lateral or central console or in an armrest of the pilot's seat).

SUMMARY OF THE INVENTION

One aim of the invention is to propose a flight control device with three axes of rotation (allowing for example the control of the attitude of the aircraft on the roll, pitch and yaw axes) which can be easily integrated into the environment of the flight deck.

This problem is resolved within the scope of the present invention thanks to a flight control device for an aircraft comprising:
 a casing,
 a handle rotatably mounted with respect to the casing around a center of rotation,
 a first drive shaft, a second drive shaft and a third drive shaft, the drive shafts being rotatably mounted with respect to the casing along the same axis of rotation,
 a first connecting part pivotally mounted, on the one hand, on the first shaft around a first axis of rotation, and on the other hand on the handle around a fourth axis of rotation,
 a second connecting part pivotally mounted, on the one hand, on the second shaft around a second axis of rotation, and on the other hand on the handle around a fifth axis of rotation,
 a third connecting part pivotally mounted, on the one hand, on the third shaft around a third axis of rotation, and on the other hand on the handle around a sixth axis of rotation,
 wherein the first axis, the second axis and the third axis of rotation intersect at the center of rotation of the handle.

In such a device, the drive shafts are rotatably mounted with respect to the casing along the same axis of rotation, which allows dispensing with mutually aligned motors for generating force feedback on the drive shafts.

In addition, the proposed device allows the attitude of the aircraft to be controlled on three axes (roll, pitch and yaw). It is thus possible to eliminate the rudder pedals which conventionally allow the attitude of the aircraft to be controlled along the yaw axis.

The device can further have the following features:
 the first axis, the second axis and the third axis of rotation define a conical surface of revolution having an apex angle comprised between 15 and 30 degrees,
 the first axis, the second axis and the third axis of revolution are arranged with an identical angular spacing between two axes.
 the fourth, the fifth and the sixth axes of rotation intersect in the center of rotation of the handle,
 the fourth, the fifth and the sixth axes of rotation extend in a same plane,
 the fourth, the fifth and the sixth axes of rotation are arranged with an angular spacing of 120 degrees with respect to one another,
 the first drive shaft, the second drive shaft and the third drive shaft are coaxial.
 the device comprises a first motor for generating a first resisting torque on the first drive shaft against a drive torque generated on the first drive shaft by a pilot activating the handle, a second motor for generating a second resisting torque on the second drive shaft against a drive torque generated on the second drive shaft by the pilot, and a third motor for generating a third resisting torque on the third drive shaft against a drive torque generated on the third drive shaft by the pilot,
 the motors are disposed by being aligned along the axis of rotation of the first drive shaft, of the second drive shaft and of the third drive shaft.

PRESENTATION OF THE DRAWINGS

Figure 2:
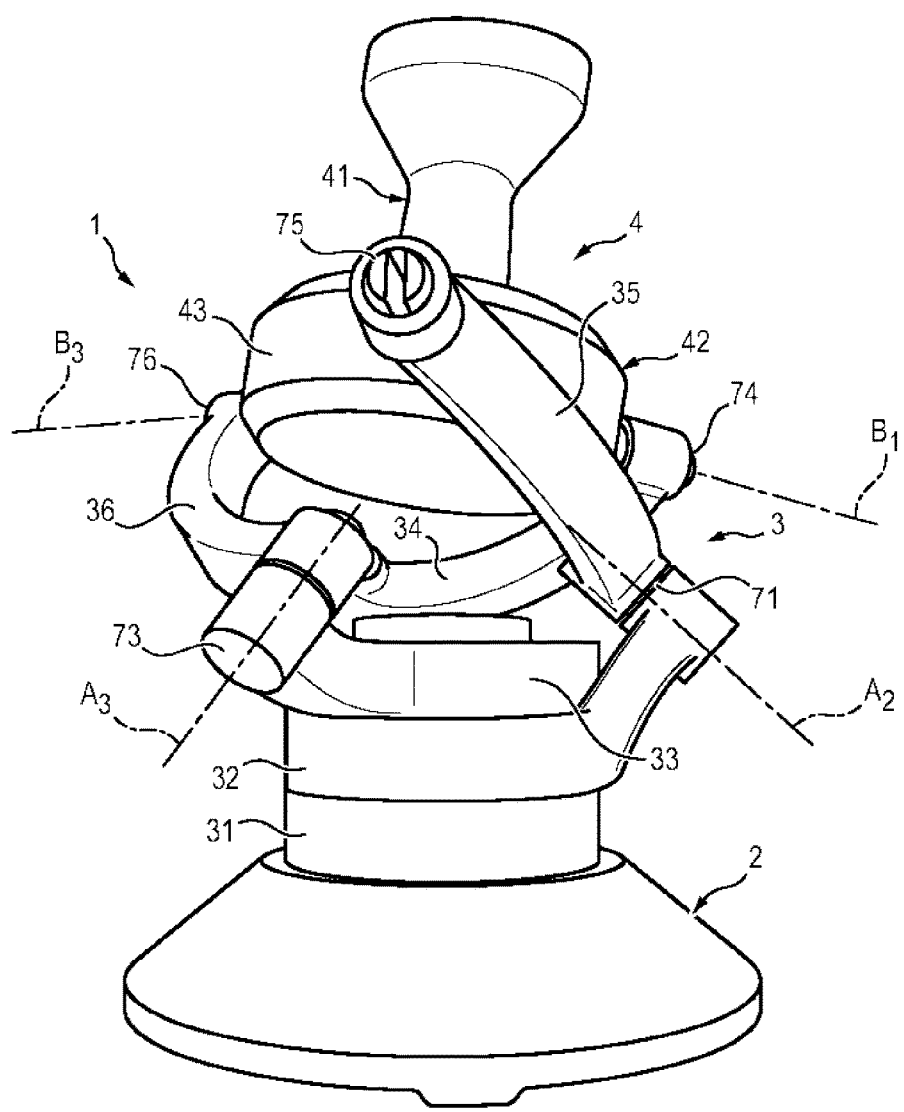
Figure 3:
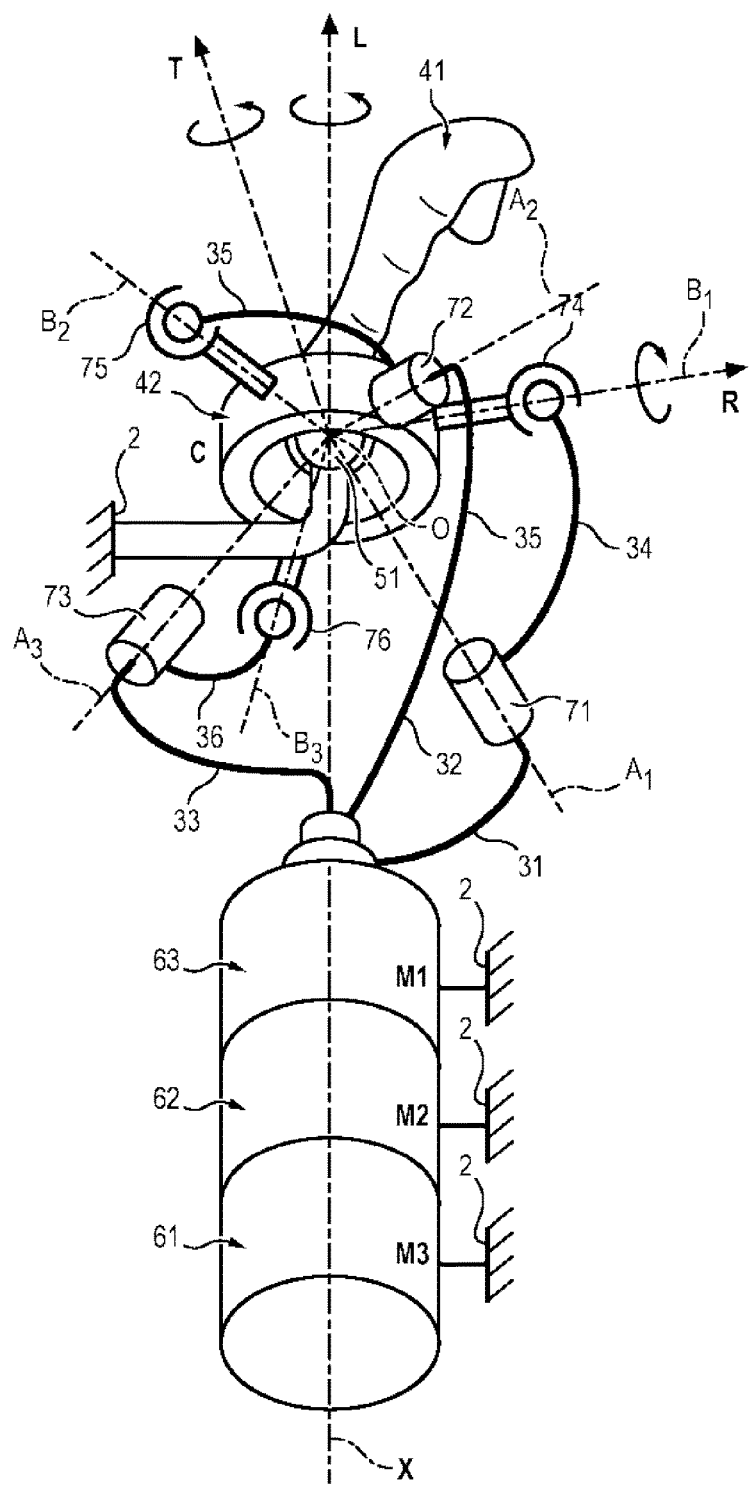

Other features and advantages will be revealed by the description that follows, which is purely illustrative and not limiting, and must be read with reference to the appended drawings, among which:

FIG. 1 shows schematically a flight control device conforming to one embodiment of the invention, FIG. 2 shows schematically a variant of the device of FIG. 1, FIG. 3 is a kinematic schematic of the device of FIG. 1.

DETAILED DESCRIPTION OF ONE EMBODIMENT

In FIG. 1, the flight control device 1 shown comprises a casing 2, a mechanical linking assembly 3, and a handle 4 rotatably mounted with respect to the casing 2.

The casing 2 is intended for example to be integrated into a column in the flight deck or into an armrest of a pilot seat.

The handle 4 comprises a gripping portion 41 suitable to be grasped by the hand of the pilot and a connecting portion 42 allowing the handle 4 to be connected to the mechanical linking assembly 3. The handle 4 is rotatably mounted with respect to the casing 2 along three axes of rotation, namely: a roll axis R, a pitch axis T and a yaw axis L (the axes R, L and T are visible in FIG. 3).

The mechanical linking assembly 3 allows a movement of the handle 4 on the order of 15 to 20 degrees along the roll R and pitch L axes.

In the embodiment illustrated in FIG. 1, the device 1 further comprises a central part 51 fixedly mounted with respect to the casing 2 and having a spherical outer surface. The connecting portion 42 of the handle 4 comprises a ring 43 having a spherical inner surface. The ring 43 surrounds the central part 51. The spherical surfaces cooperate with one another to form a ball joint between the handle 4 and the casing 2. The handle 4 is thus linked to the casing 2 through the ball joint.

The mechanical linking assembly 3 is housed inside the casing 2. The mechanical linking assembly 3 allows, on the one hand, connecting the handle 4 to the casing 2 while allowing rotation of the handle 4 with respect to the casing 2 along the three axes of rotation R, L and T, and, on the other hand, connecting the handle 4 to position sensors and to motors for generating force feedback on the handle 4 along the three axes of rotation.

The mechanical linking assembly 3 comprises three drive shafts 31 to 33 and three connecting parts 34 to 36.

More precisely, the mechanical assembly 3 comprises a first drive shaft 31, a second drive shaft 32 and a third drive shaft 33. Each of the drive shafts 31 to 33 is mounted mobile in rotation with respect to the casing 2. The drive shafts 31 to 33 are mobile in rotation around a common axis of rotation (the axis X shown in FIG. 3). The drive shafts 31 to 33 are disposed coaxially. The first drive shaft 31 is tubular and surrounds the second drive shaft 32. The second drive shaft 32 is also tubular and surrounds the third drive shaft 33. Thus, the drive shafts 31 to 33 are disposed coaxially by being nested in one another.

In use, when the device 1 is mounted in a column in the flight deck or in an armrest of the pilot seat, the axis of rotation X extends along a vertical direction.

The mechanical linking assembly 3 further comprises a first connecting part 34, a second connecting part 35 and a third connecting part 36.

The first connecting part 34 links the first drive shaft 31 to the handle 4. The first connecting part 34 is pivotally mounted on the one hand on the first shaft 31 around a first axis of rotation $A_1$ through a pivot link 71, and on the other hand to the handle 4 around a fourth axis of rotation $B_1$ through a pivot link or ball joint 74.

Likewise, the second connecting part 35 links the second drive shaft 32 to the handle 4. The second connecting part 35 is pivotally mounted on the one hand on the second shaft 32 around a second axis of rotation $A_2$ through a pivot link 72, and on the other hand on the handle 4 around a fifth axis of rotation $B_2$ through a pivot link or ball joint 75.

Finally, the third connecting part 36 links the third drive shaft 33 to the handle 4. The third connecting part 36 is pivotally mounted on the one hand on the third shaft 33 around a third axis of rotation $A_3$ through a pivot link 73, and on the other hand on the handle 4 around a sixth axis of rotation $B_3$ through a pivot link or ball joint 76.

More precisely, the connecting parts 34 to 36 are rotatably mounted on the connecting part 42 of the handle 4

The pivot links 71 to 73 are arranged so that the first axis $A_1$, the second axis $A_2$ and the third axis $A_3$ of rotation define a conical surface of revolution. The conical surface of revolution has an apex angle comprised between 15 and 30 degrees. Moreover, the apex of the conical surface is congruent with the center of rotation O of the handle 4. In other words, the first axis $A_1$, the second axis $A_2$ and the third axis $A_3$ of rotation intersect at the center of rotation O of the handle 4.

Likewise, the fourth axis $B_1$, the fifth axis $B_2$ and the sixth axis $B_3$ of rotation intersect at the center of rotation O of the handle 4. In addition, the fourth axis $B_1$, the fifth axis $B_2$ and the sixth axis $B_3$ of rotation extend in the same plane.

The handle 4 is in a neutral position when the plane in which the fourth, fifth and sixth axes of rotation $B_1$ to $B_3$ is orthogonal to the axis of rotation X of the drive shafts 31 to 33.

In the neutral position, the first axis $A_1$, the second axis $A_2$ and the third axis $A_3$ of rotation are arranged with an identical angular separation between two successive axes.

In a variant of the flight control device illustrated in FIG. 2, the device 1 does not comprise a central part 51. In other words, the ball joint between the handle 4 and the casing 2 has been eliminated.

The operation of the device of FIG. 2 is identical to the operation of the device of FIG. 1.

However, in the device of FIG. 1, the ball joint has the effect of making the mechanical link between the handle 4 and the casing 2 hyperstatic, which allows an increase in the robustness of the device.

As illustrated in FIG. 3, the flight control device 1 further comprises three motors 61, 62 and 63.

More precisely, the flight control device 1 comprises a first motor 61 to drive in rotation the first drive shaft 31 with respect to the casing 2, a second motor 62 to drive in rotation the second drive shaft 32 with respect to the casing 2, and a third motor 63 to drive in rotation the third drive shaft 33 with respect to the casing 2 around the axis X.

The first motor 61, the second motor 62 and the third motor 63 are suitable for generating a torque respectively on the first drive shaft 31, the second drive shaft 32 and the third drive shaft 33, so as to generate force feedback on the handle 4 through the mechanical linking assembly 3.

As illustrated in FIG. 3, the motors 61 to 63 are disposed by being aligned along the axis of rotation X of the drive shafts 31 to 33.

The device 1 can comprise position sensors provided to measure an angular position of each drive shaft 31 to 33. Each position sensor can consist of an incremental coder comprising a rotating disk rotationally fixed to the rotor of the motor with which it is associated. Each position sensor is suitable for generating a position signal representing the angular position of the rotor with respect to the stator (hence of the angular position of the drive shaft with which it is associated with respect to the casing).

The position signals are transmitted to the flight control computer (FCC) of the aircraft so as to control the movement of the flight control surfaces of the aircraft.

Moreover, the flight control computer is suitable for controlling the motors 61 to 63 depending on the position signals which it receives from the position sensors, so as to generate force feedback on the three axes of rotation T, R and L of the handle 4.

In operation, if the pilot does not exert any force on the handle 4, the handle 4 is held in the neutral position.

In order to vary the position of the flight control surfaces, the pilot can move the handle 4 along the three axes of rotation T, R and L.

The movement of the handle 4 along these three axes has the effect of moving in rotation each of the drive shafts 31 to 33 along the axis of rotation X. In other words, the mechanical linking assembly 3 converts the rotation of the handle 4 along the three axes T, R, and L into three rotations of the drive shafts along the axis X.

Each position sensor generates a position signal representing the angular position of the drive shaft which is associated with it.

The position signals are transmitted to the flight control computer (FCC) of the aircraft, which controls the movements of the flight control surfaces of the aircraft depending on these position signals.

The flight control computer also generates setpoint signals to control each of the motors 61 to 63 depending on the position signals which it receives. The setpoint signals are determined depending on a control law, so as to generate force feedback on the three axes of rotation T, R and L of the handle 4.

In such a device, the force feedback generated on each of the axes T, R and L is a combination of the torques generated by the motors 61 to 63.

The invention claimed is:

1. A flight control device for an aircraft, comprising:
    a casing,
    a handle rotatably mounted with respect to the casing around a center of rotation,
    a first drive shaft, a second drive shaft and a third drive shaft, the drive shafts being rotatably mounted with respect to the casing along the same axis of rotation,
    a first connecting part pivotally mounted on the first drive shaft around a first axis of rotation, and on the handle around a fourth axis of rotation,
    a second connecting part pivotally mounted on the second drive shaft around a second axis of rotation, and on the handle around a fifth axis of rotation,
    a third connecting part pivotally mounted on the third drive shaft around a third axis of rotation, and on the handle around a sixth axis of rotation,
    wherein the first axis, the second axis and the third axis of rotation intersect at the center of rotation of the handle.

2. The flight control device according to claim 1, wherein the first axis, the second axis and the third axis of rotation define a conical surface of revolution having an apex angle comprised between 15 and 30 degrees.

3. The flight control device according to claim 2, wherein, when the handle is in a neutral position in which the fourth, fifth and sixth axes of rotation are orthogonal to the axis of rotation of the drive shafts, the first axis, the second axis and the third axis of rotation are arranged with an identical angular spacing between two axes.

4. The flight control device according to claim 1, wherein the fourth, the fifth and the sixth axes of rotation intersect at the center of rotation of the handle.

5. The flight control device according to claim 4, wherein the fourth, the fifth and the sixth axes of rotation extend in a same plane.

6. The flight control device according to claim 4, wherein the fourth, the fifth and the sixth axes of rotation are arranged with an angular spacing of 120 degrees with respect to one another.

7. The flight control device according to claim 1, wherein the first drive shaft, the second drive shaft and the third drive shaft are coaxial.

8. The flight control device according to claim 1, comprising a first motor for generating a first resisting torque on the first drive shaft against a drive torque generated on the first drive shaft by a pilot activating the handle, a second motor for generating a second resisting torque on the second drive shaft against a drive torque generated on the second drive shaft by the pilot, and a third motor for generating a third resisting torque on the third drive shaft against a drive torque generated on the third drive shaft by the pilot.

9. The flight control device according to claim 8, wherein the motors are aligned along the axis of rotation of the first drive shaft, of the second drive shaft and of the third drive shaft.

* * * * *